(12) United States Patent
Shan

(10) Patent No.: US 7,200,505 B2
(45) Date of Patent: Apr. 3, 2007

(54) METHODS AND SYSTEMS FOR IDENTIFYING RECURRENT PATTERNS

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/001,458

(22) Filed: Dec. 1, 2004

(65) Prior Publication Data

US 2006/0116830 A1     Jun. 1, 2006

(51) Int. Cl.
*G06F 19/00*    (2006.01)
(52) U.S. Cl. .................... 702/76; 324/76.11
(58) Field of Classification Search ............ 702/76, 702/182–185, 189, 77; 438/14; 324/76.11, 324/76.77
See application file for complete search history.

(56) References Cited

U.S. PATENT DOCUMENTS

| 5,712,985 | A | | 1/1998 | Lee et al. |
| 5,852,793 | A | * | 12/1998 | Board et al. .................. 702/56 |
| 6,760,847 | B1 | * | 7/2004 | Liu et al. .................... 713/300 |
| 2006/0041201 | A1 | * | 2/2006 | Behbehani et al. ......... 600/521 |

* cited by examiner

*Primary Examiner*—Edward Raymond

(57) ABSTRACT

Systems and methods are disclosed for identifying recurrent patterns. In one embodiment, a method comprises: estimating a power spectral density of a time series; determining a duration-level associated with a peak in the power spectral density; and aggregating the time series at the duration-level to obtain a recurrent pattern.

23 Claims, 4 Drawing Sheets

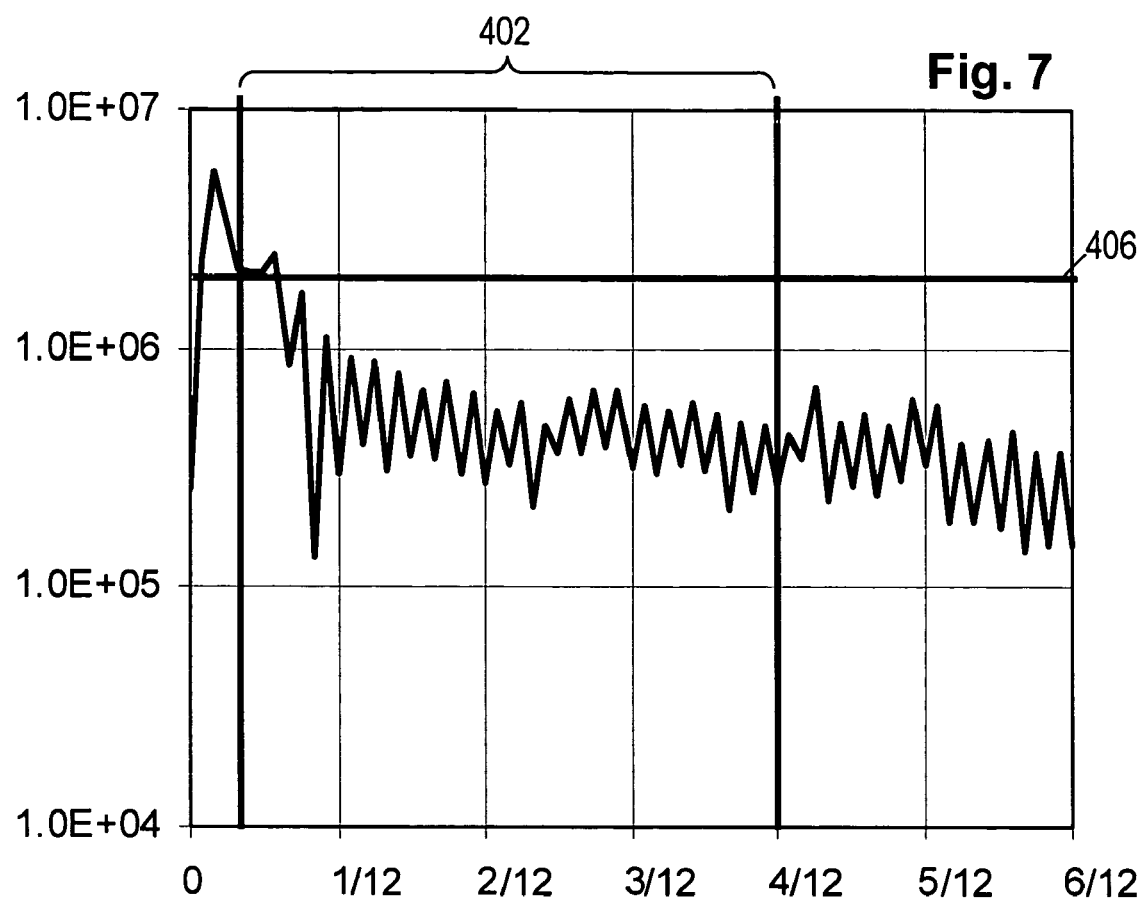

METHODS AND SYSTEMS FOR IDENTIFYING RECURRENT PATTERNS

BACKGROUND

Commercial enterprises compete for customers by promising, among other things, low prices and fast delivery. Successful competition often requires careful monitoring of profit margins and deadlines. Such monitoring requires a system that provides accurate and timely business information. It is no longer sufficient to periodically examine financial data and other information that indicates the state of the corporation. Rather, continual monitoring is necessary. Businesses rely on their latest performance information to support strategic planning and decision making, so any businesses without a system for providing accurate and timely business information would be placed at a huge disadvantage.

Accordingly, most businesses track at least their financial data in a computerized financial reporting system that can generate reports on demand. Many large entities have reporting systems that continually process large numbers of complex transactions which may be occurring at many locations around the world. With such information readily available, corporations are turning to sophisticated forms of data processing to identify patterns and provide forecasts. Often an overabundance of information is now readily available for processing, and analysts may desire an automated method of recurrent pattern extraction to simplify modeling and forecasting operations.

SUMMARY

Accordingly, there is disclosed herein systems and methods for identifying recurrent patterns. Some embodiments may be a method comprising: estimating a power spectral density of a time series; determining a duration-level associated with a peak in the power spectral density; and aggregating the time series at the duration-level to obtain a recurrent pattern.

BRIEF DESCRIPTION OF THE DRAWINGS

For a detailed description of illustrative embodiments, reference will now be made to the accompanying drawings in which:

FIG. 7 is a graph of the power spectral density for the illustrative data in FIG. 6.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

The term "recurrent pattern" as used herein refers to repeatable, time-dependent patterns in the data. The patterns are not necessarily periodic, and indeed, the patterns identified by the disclosed methods may reflect events that do not occur at regular intervals. The term "duration-level" refers to an average time scale of a recurrent pattern. The duration-level for the recurrent patterns may range from seconds to centuries, depending on the data being analyzed.

DETAILED DESCRIPTION

The following discussion is directed to various invention embodiments. The disclosed embodiments should not be interpreted, or otherwise used, as limiting the scope of the disclosure or the claims. In addition, one skilled in the art will understand that the following description has broad application. The discussion of any embodiments is meant only to be illustrative of those embodiments, and is not intended to suggest that the scope of the disclosure or the claims is limited to those embodiments.

Figure 1:
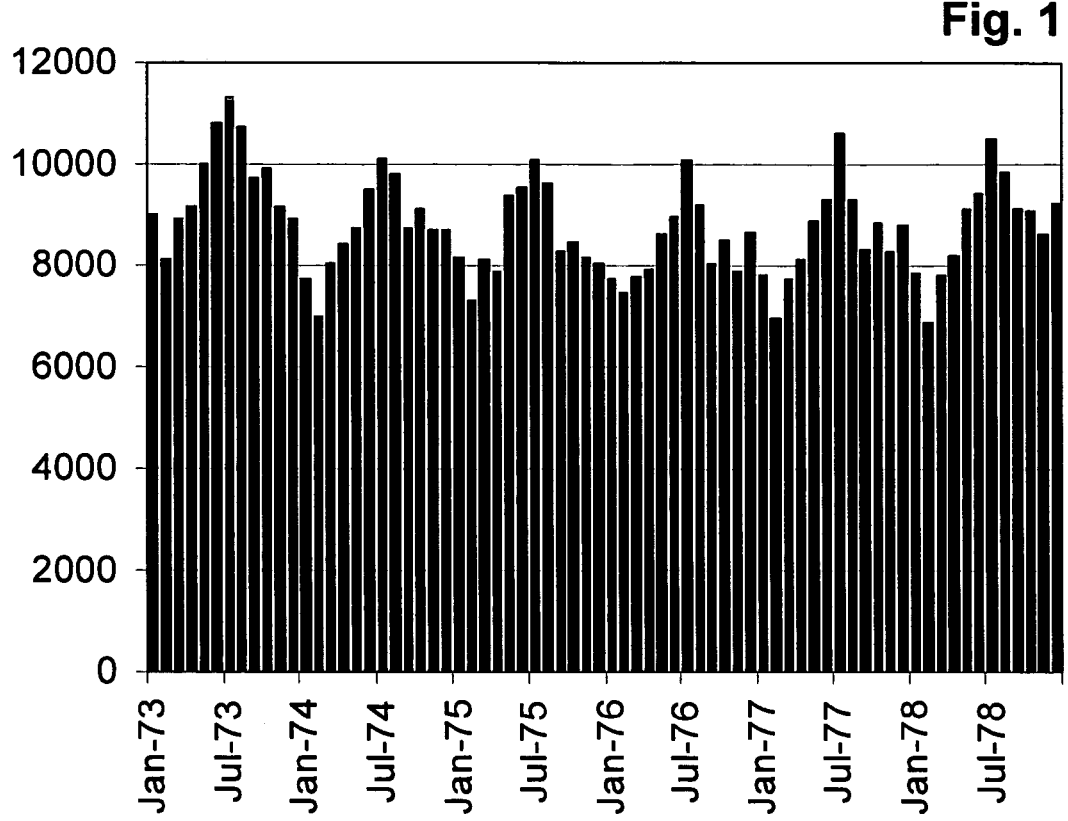
FIG. 1 is a graph of illustrative time-series data.

FIG. 1 is a graph of illustrative time-series data that will be used as an example to explain the disclosed methods. The data shown is monthly totals of accidental deaths in the U.S. for the years 1973–78, however, the disclosed methods lend themselves to data analysis of all types. The methods disclosed herein may be applied to any time-series measurement of a business attribute, such as visits, transactions, sales, inventory, man-hours, costs, revenue, savings, liabilities, quantifiable risks, patents, licensees, customers, product demand, traffic patterns and network usage. The time scale is divided into time periods such as hours, days, weeks, months, quarters, years, or fiscal periods. The time periods may be fixed in length or they may vary from period to period. The choice of time periods may depend on the behavior being analyzed and the expected repetition patterns within such behaviors.

Inspection of the data in FIG. 1 suggests that at least one underlying pattern exists. The challenge is to identify and extract the pattern(s) from the data.

Figure 2:
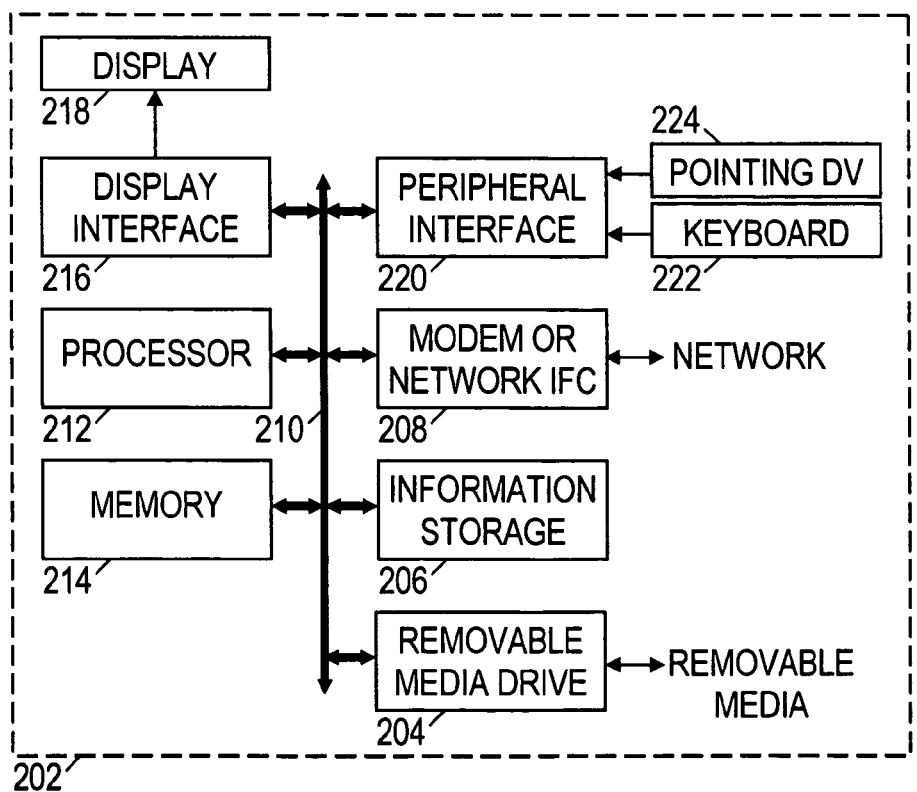
FIG. 2 is a block diagram of an illustrative recurrent pattern identification system in accordance with certain embodiments of the invention.

FIG. 2 is a block diagram of an illustrative recurrent pattern identification system 202. System 202 is shown as a desktop computer, although any electronic device coupled to a user interface and some amount of computing power may be configured to carry out the methods disclosed herein. Among other things, servers, portable computers, personal digital assistants (PDAs) and graphing calculators may be configured to carry out the disclosed methods.

System 202 in some embodiments, comprises a removable media drive 204, an internal information storage device 206, and/or a network interface 208. Any or all of these devices may provide access to software for implementing the disclosed methods and access to data that is to be processed in accordance with the disclosed methods. For example, the software and/or data may be stored on removable magnetic or optical media that can be read by drive 204. Alternatively, the software and/or data may be stored by information storage device 206, which may take the form of a hard disk drive or a flash memory. As another alternative, the software and/or data may be stored on a network device that is accessible to network interface 208. The information storage media and information transport media (i.e., the networks) are collectively called "information carrier media."

System 200 may be a bus-based system with a bus 210 interconnecting the other elements and carrying communications between them. Processor 212 retrieves software and data from devices 204, 206, and 208. The retrieved software and data is stored in system memory 214 for fast access. Processor 212 carries out the operations specified by the retrieved software. Among other things, the software configures the processor to generate images that are conveyed to display interface 216. The display interface 216 may take the form of a video card or other suitable display interface that accepts information from the bus 210 and transforms it into a signal format suitable for the display 218.

In addition to creating images to communicate with a user, the software configures processor 212 to collect information from peripheral interface 220. The peripheral interface 220 may accept signals from a keyboard 222 and/or other input devices such as a pointing device 224, and may transform them into a form suitable for communication on the bus 210.

The processor 212, and hence the system 202 as a whole, operates in accordance with one or more programs stored on the information storage device 206. The processor 212 executes operating system software that coordinates the operation of display 218 and input devices 222, 224 to create a user interface. The user interface allows the user to select and configure operations to be performed by system 202. The processor 212 may copy portions of software programs into the memory 214 for faster access, and may switch between programs or carry out additional programs in response to user actuation of the input devices 222, 224. The additional programs may be retrieved from information the storage device 206 or may be retrieved from removable storage media or from remote locations via the network interface 208. Among the operations that the user may initiate is the retrieval and execution of software that embodies the disclosed methods for identifying recurrent patterns.

Figure 3:
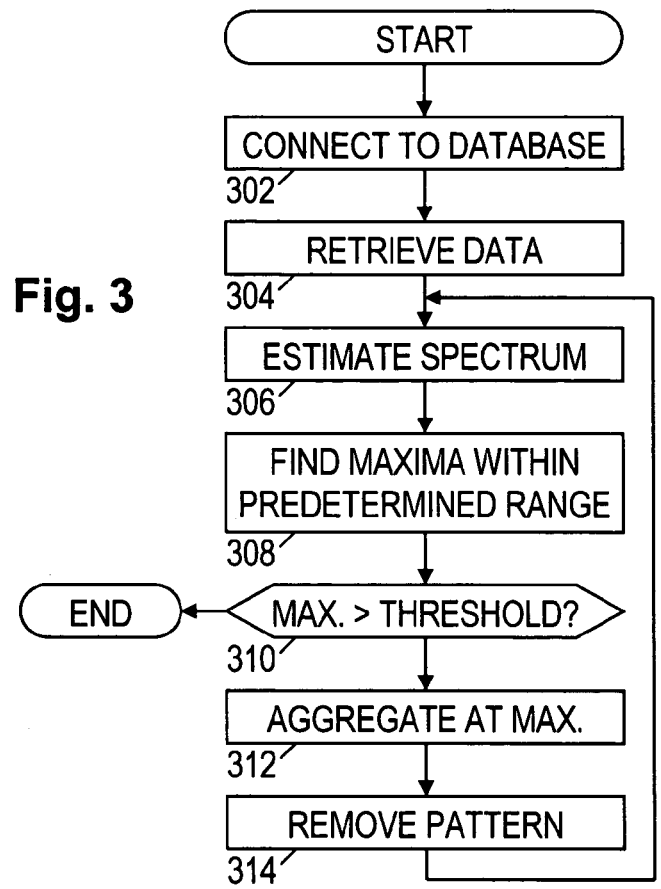
FIG. 3 is a flow diagram of an illustrative recurrent pattern identification method in accordance with certain embodiments of the invention.

FIG. 3 shows a flow diagram of an illustrative pattern identification method. The illustrative method may be embodied in software, and may be used in conjunction with other processing methods for modeling, forecasting, or other data analysis.

Beginning in block 302, the processor connects to a database or otherwise opens a file to access time series data. The file or database may be selected or otherwise identified by a system user. In block 304, the processor retrieves the data. (Illustrative data is shown in FIG. 1.) In block 306, the processor calculates a power spectral density estimate.

The power spectral density of a stationary random time series x[n] is defined as $$P_x(f) = \sum_{k=-\infty}^{\infty} r_{xx}[k]e^{-i2\pi fk} \qquad -\frac{1}{2} \leq f \leq \frac{1}{2} \qquad (1)$$

where i is the imaginary unit equal to the square root of −1, and where $r_{xx}[k]$ is the autocorrelation function of time series x[n], defined as $$r_{xx}[k] = E\{x^*[n]x[n+k]\}. \qquad (2)$$

The autocorrelation is unknown, but can be estimated by $$r_{xx}[k] \approx \frac{1}{N-k} \sum_{n=0}^{N-1-k} x^*[n]x[n+k] \qquad 0 \leq k \leq N-1 \qquad (3)$$

where N is the number of samples in the time series.

Alternatively, the periodogram may be used to estimate the power spectral density of the time series. The periodogram estimator is defined as:

$$P_{PER}(f) = \frac{1}{N}\left|\sum_{n=0}^{N-1} x[n]e^{-i2\pi fn}\right|^2 \qquad -\frac{1}{2} \leq f \leq \frac{1}{2} \qquad (4)$$

Figure 4:
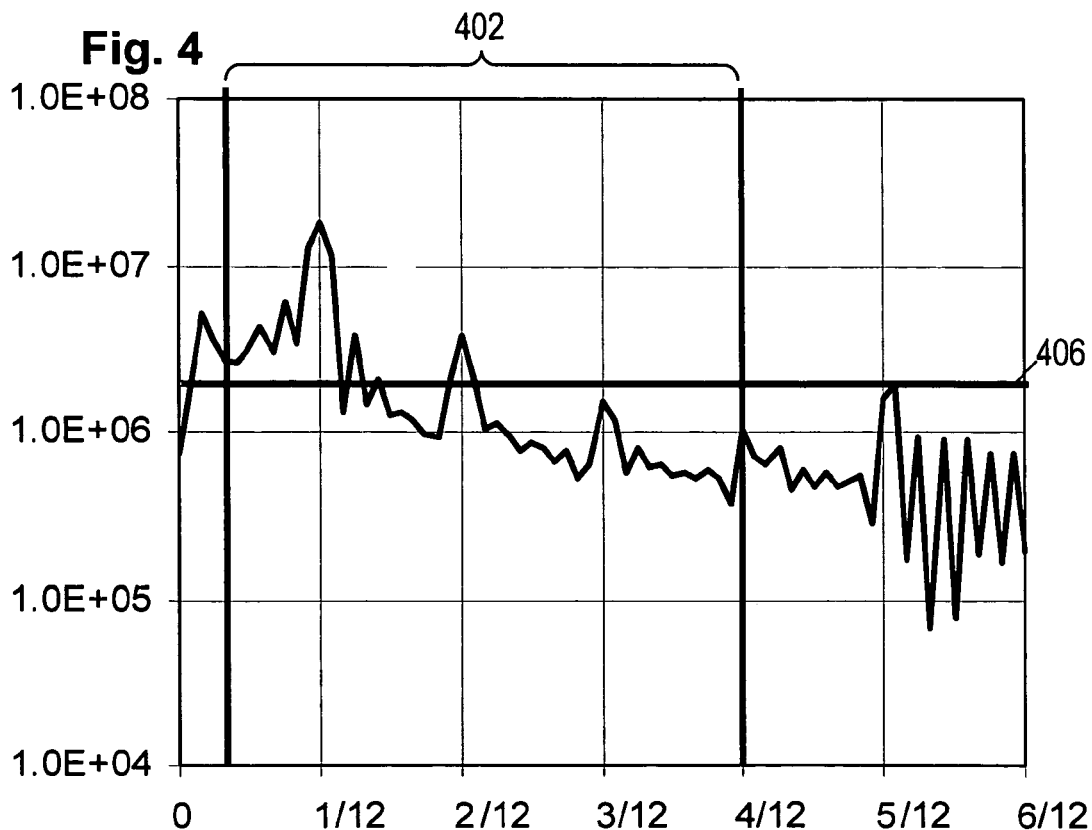
FIG. 4 is a graph of the power spectral density for the illustrative data in FIG. 1.

When estimating the power spectral density, it may be beneficial to force the time series to a zero mean by subtracting the time series average from each time series value. FIG. 4 shows an estimate of the power spectral density for the data of FIG. 1. Since the time series is real rather than complex valued, the spectrum is symmetric about the y-axis. Accordingly, only the range from f=0 to ½ is shown. The power spectral density was calculated on the zero mean time series using equations (1) and (3).

In block 308 (FIG. 3), the processor searches within a predetermined frequency range 402 (FIG. 4) for spectral peaks. The frequency range is determined based on the desired pattern information or the intended use of the recurrent variation. The upper end of the frequency range is determined by the smallest time scale of interest. In this example, the lower end of the time scale has been set at three sample periods (3 months), which corresponds to a upper frequency limit of f=⅓. Conversely, the lower end of the frequency range is determined by the largest time scale of interest, which may be limited by the amount of data available. With only six years of data available, the upper end of the time scale has been set to 3 years (36 sample periods), which corresponds to a lower frequency limit of f=1/36.

Within the frequency range 402, there are a number of peaks. The processor finds the largest peak, and in block 310 (FIG. 3), compares the largest peak to a threshold. The threshold 406 (FIG. 4) is chosen to screen out relatively insignificant peaks, and may be set in any number of ways. In the present example, threshold 406 was chosen to equal twice the zero-lag autocorrelation, or $2r_{xx}[0]$. The same frequency range 402 and threshold 406 are used in future iterations.

Figure 5:
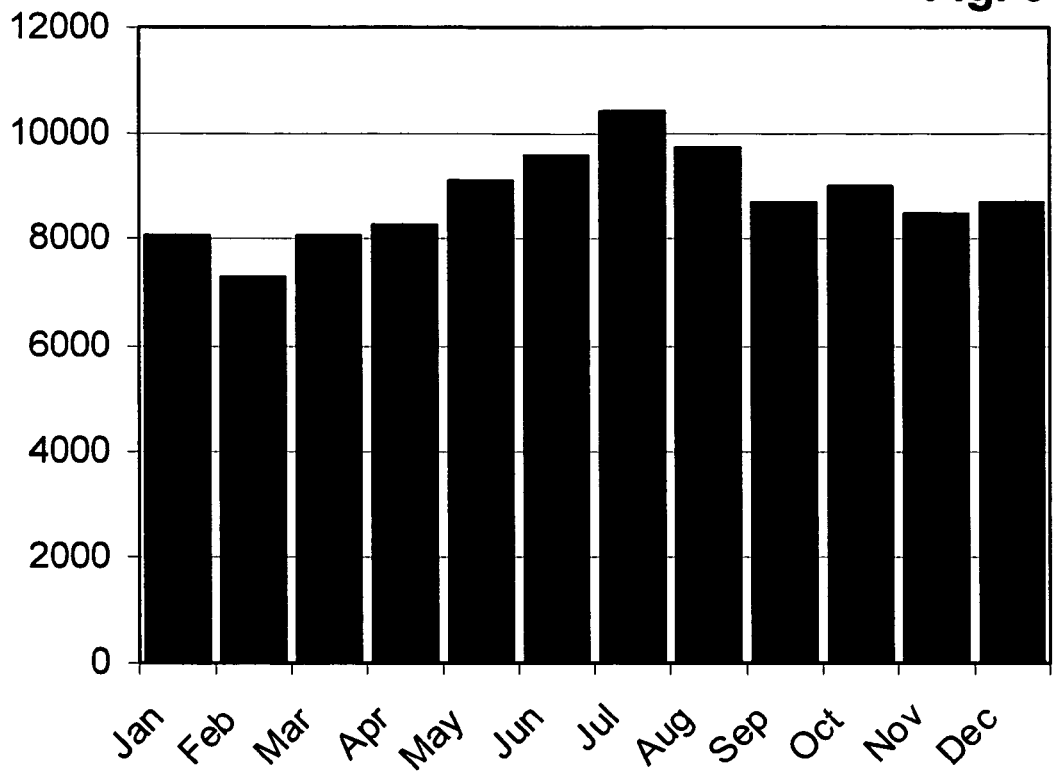
FIG. 5 is a graph of time series data aggregated at the duration-level associated with the periodogram maximum.

Inspection of FIG. 4 reveals the largest peak in frequency range 402 is the peak at f=1/12, which also exceeds threshold 406. Having found a peak that exceeds the threshold, in block 312 (FIG. 3), the processor determines the duration-level associated with the peak. The frequency associated with the peak is f=1/12, representing one cycle every 12 sample periods. Inverting the frequency yields a pattern duration-level of 12 samples, or one year in the present example. The processor then aggregates the data at this duration-level to find an average pattern. The aggregating operation can be conceptualized as writing the time series row by row into a table having the number of columns given by the aggregation duration-level, and determining an average value for each column in the table. Thus, in the current example, the table would have twelve columns and six rows. Each column is averaged together to obtain the pattern shown in FIG. 5.

Figure 6:
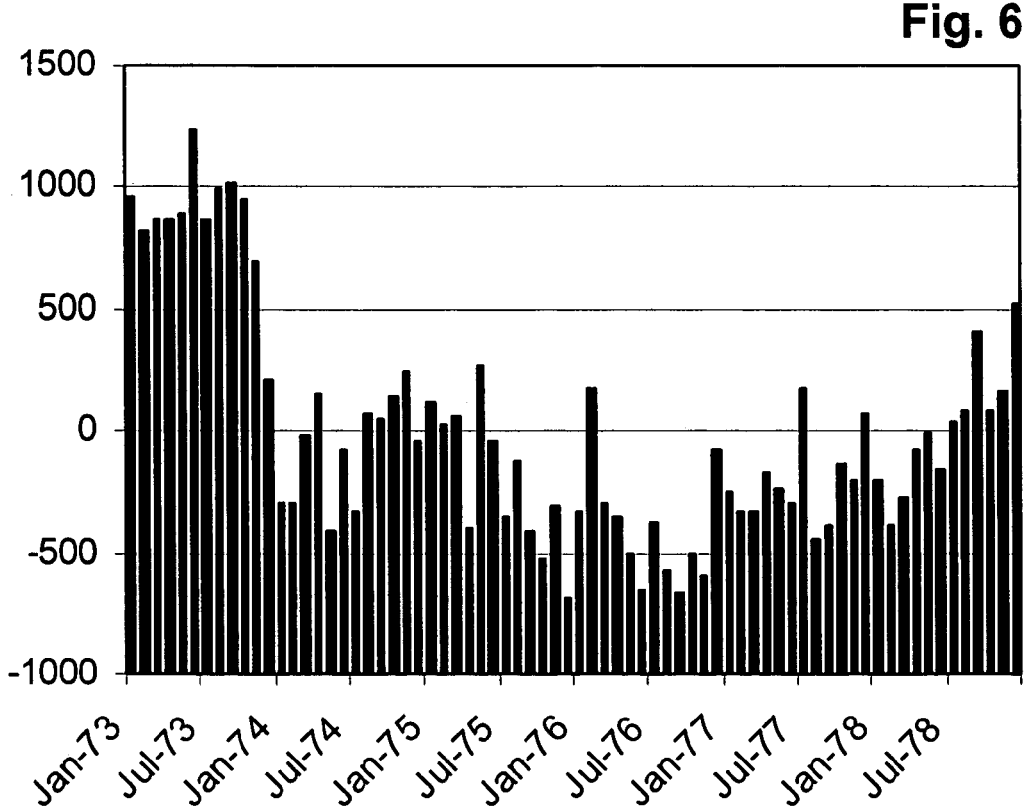
FIG. 6 is a graph of the illustrative-time-series data with the aggregated pattern removed.

In block 314 (FIG. 3), the pattern is replicated to form a time series of the same length as the original time series, and is subtracted from the original time series. FIG. 6 shows the resulting time series with the yearly pattern removed. That is, the illustrative time-series has had all recurrences at the first duration-level removed. The present example concerns an additive pattern, but multiplicative patterns may be identified as previously described, then removed by dividing the values in the original time series by the corresponding values in the replicated pattern series.

Returning to FIG. 3, the processor returns to block 306 and estimates the spectrum of the new time series. FIG. 7 shows the new power spectral density for the time series with the pattern removed. The original peaks at $f=1/12$ and $2/12$ have disappeared, leaving only one threshold-exceeding peak within the frequency range 402 at $f=0.05$. The processor may repeat blocks 308, 310, 312, and 314, to identify and remove a pattern with a duration-level of 20 samples. Interpolation may be used to account for pattern duration-levels where the derived duration level is not a whole number.

The duration-levels identified by the disclosed methods may be used in constructing models for the data. The models may be configured with seasonal filters set in accordance with the extracted duration-levels, and then the model may be trained on the existing data to obtain the proper filter coefficients. An example of a seasonal model that may be designed in this fashion is the SARIMA model, which is described in "Time Series Analysis: Forecasting and Control," $3^{rd}$ edition, by George E. P. Box, Gwilym M. Jenkins, Gregory C. Reinsel.

The above-described methods and systems may offer a number of advantages. The disclosed methods can automatically identify multiple recurrent cycles in any temporal data, and for each of the identified cycles, the cycle duration-level is determined. The cycle pattern may be automatically and robustly extracted by aggregated the data, and the pattern may be automatically removed from the data to allow for further analysis.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of illustrative embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A processor-based method comprising:
   measuring a business attribute as a time series;
   estimating a power spectral density of the time series;
   determining a duration-level associated with a peak in the power spectral density; and
   aggregating the time series at the duration-level to obtain a recurrent pattern.

2. The method of claim 1, further comprising replicating the recurrent pattern to obtain a pattern series.

3. The method of claim 2, further comprising subtracting the pattern series from the time series.

4. The method of claim 2, further comprising dividing values in the time series by corresponding values in the pattern series.

5. The method of claim 2, further comprising:
   removing the pattern series from the time series to obtain a resulting time series; and
   estimating a new power spectral density of the resulting time series.

6. The method of claim 5, further comprising:
   determining a secondary duration-level associated with a peak in the new power spectral density; and
   aggregating the resulting time series at the secondary duration-level to obtain a second recurrent pattern.

7. The method of claim 1, further comprising:
   selecting a peak in the power spectral density, wherein the selecting comprises searching within a predetermined frequency range.

8. The method of claim 7, wherein the predetermined frequency range has a lower frequency corresponding to one cycle in half the duration of the time series.

9. The method of claim 7, wherein the selecting comprises comparing the peak value to a predetermined threshold and halting if no peaks exceed the threshold within the predetermined frequency range.

10. A computer comprising:
    a display;
    a processor coupled to the display; and
    a memory coupled to the processor,
    wherein the memory stores software that configures the processor to extract a recurrent pattern from a time series, wherein as part of extracting the recurrent pattern, the software configures the processor to:
    estimate a power spectral density of the time series;
    determine a duration-level associated with a peak in the power spectral density;
    aggregate the time series at the duration-level to obtain the recurrent pattern; and
    display the recurrent pattern on the display.

11. The computer of claim 10, wherein as part of extracting the recurrent pattern, the software configures the processor to remove the recurrent pattern from the time series to obtain a resulting time series.

12. The computer of claim 11, wherein the software further configures the processor to estimate a resulting power spectral density of the resulting time series.

13. The computer of claim 12, wherein the software further configures the processor to determine a secondary duration-level associated with a peak in the new power spectral density, and to aggregate the resulting time series at the secondary duration-level to obtain a second recurrent pattern.

14. The computer of claim 10, wherein as part of extracting the recurrent pattern, the software configures the processor to search a predetermined frequency range to select a peak in the power spectral density.

15. The computer of claim 14, wherein the predetermined frequency range has a lower frequency corresponding to one cycle in half the duration of the time series.

16. The computer of claim 14, wherein the selecting comprises comparing the peak value to a predetermined threshold and halting if no peaks exceed the threshold within the predetermined frequency range.

17. An information carrier medium that communicates software to a computer, said software configuring the computer to:
    calculate a spectral density of a time series;
    determine a duration-level associated with a peak in the spectral density;

aggregate the time series at the duration-level to obtain a recurrent pattern; and display the recurrent pattern.

18. The medium of claim 17, wherein the software further configures the computer to replicate the recurrent pattern to obtain a pattern series.

19. The medium of claim 17, wherein the software further configures the computer to:

remove the pattern series from the time series to obtain a resulting time series; and calculate a new spectral density of the resulting time series.

20. The medium of claim 19, wherein the software further configures the computer to:

determine a secondary duration-level associated with a peak in the new spectral density; and aggregate the resulting time series at the secondary duration-level to obtain a second recurrent pattern.

21. A recurrent pattern extraction apparatus comprising:

calculation means for calculating a power spectral density of a time series for a measured business attribute;

determination means for determining a duration-level associated with a peak in the power spectral density; and aggregation means for combining time series values spaced at the duration-level to obtain a recurrent pattern.

22. The apparatus of claim 21, further comprising search means for finding the peak in a predetermined frequency range.

23. The apparatus of claim 21, further comprising removal means for removing the recurrent pattern from the time series to obtain a resulting time series.

* * * * *

UNITED STATES PATENT AND TRADEMARK OFFICE
CERTIFICATE OF CORRECTION

PATENT NO. : 7,200,505 B2
APPLICATION NO. : 11/001458
DATED : April 3, 2007
INVENTOR(S) : Jerry Z. Shan It is certified that error appears in the above-identified patent and that said Letters Patent is hereby corrected as shown below:

In column 5, line 63, in Claim 1, delete "pattern." and insert -- pattern, wherein the step of obtaining a recurrent pattern further outputs the results to a display. --, therefor.

Signed and Sealed this

Twenty-eighth Day of April, 2009

JOHN DOLL
*Acting Director of the United States Patent and Trademark Office*